Figure 1:
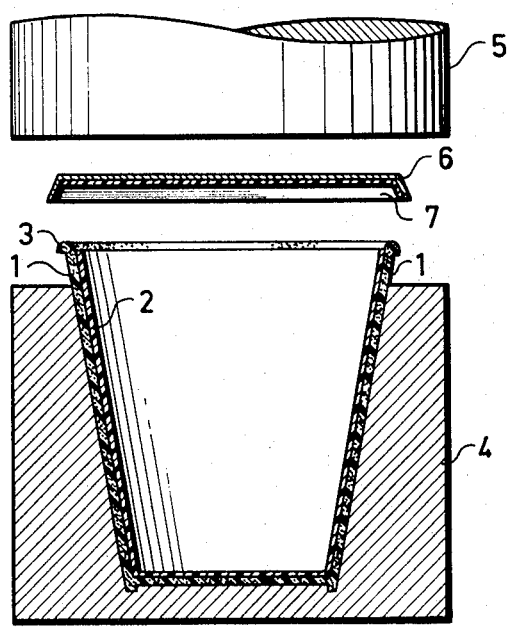

United States Patent

[11] 3,625,785

[72] Inventors: Sven Nils Hakan Holmstrom, Loberod; Jan-Erik Olsen, Lund, both of Sweden
[21] Appl. No.: 804,900
[22] Filed: Mar. 6, 1969
[45] Patented: Dec. 7, 1971
[73] Assignee: AB Tetra Pak, Lund, Sweden
[32] Priority: Apr. 4, 1968
[33] Sweden
[31] 4804

[54] METHOD OF PRODUCING A MECHANICALLY STIFF GASTIGHT PACKAGING CONTAINER
1 Claim, 4 Drawing Figs.

[52] U.S. Cl. ............................................. 156/69, 156/196, 156/272, 156/306, 220/9 F
[51] Int. Cl. ....................................... B29c 27/02
[50] Field of Search ............................. 156/69, 272, 196, 306; 215/37, 38; 53/39; 220/9 F, 97 C

[56] References Cited
UNITED STATES PATENTS

| | | | |
|---|---|---|---|
| 2,620,939 | 12/1952 | Weisgerber | 156/69 X |
| 3,243,934 | 4/1966 | Kinney | 53/39 |
| 3,460,310 | 8/1969 | Adlock et al. | 156/69 X |
| 3,475,243 | 10/1969 | Scalora | 156/69 |

FOREIGN PATENTS

| | | | |
|---|---|---|---|
| 931,960 | 7/1963 | Great Britain | |

Primary Examiner—Carl D. Quarforth
Assistant Examiner—E. E. Lehmann
Attorney—Pierce, Scheffler & Parker ABSTRACT: A method for sealing containers made of foam plastic and having a homogeneous thermoplastic lining, the top edge of the lining being initially located below the top edge of the foam plastic container, in which a lid having a thermoplastic under surface is applied to the container and pressed and heated so as to melt the top edge of the foam plastic container so that the lid can be pressed down until the thermoplastic under surface of the lid contacts and seals with the top edge of the thermoplastic lining of the container.

PATENTED DEC 7 1971 3,625,785

INVENTORS
Sven Nils Håkan Holmström
Jan-Erik Olsén

By Pierce, Scheffler & Parker
Attorneys

METHOD OF PRODUCING A MECHANICALLY STIFF GASTIGHT PACKAGING CONTAINER

This invention is concerned with a method of producing a mechanically stiff, gastight packaging container comprising a container body and a lid part, in which the container body consists of a foam plastic hollow body and of a lining of homogeneous plastic material inserted into the said hollow body, the lining being somewhat shorter than the foam plastic hollow body, which means that the lining, when it has been placed inside the foam plastic hollow body, does not reach the upper edge of this hollow body.

There is a need within packaging technology for packages that are gas and liquidtight. This need has to a certain extent been satisfied by the existing packages of sheet steel and glass, and by some plastic packages. The market however demands more and more specialized packages for different purposes, and new packages must therefore often be created in order to meet some special requirement.

A number of cup-shaped, especially conical, packages which can be closed down by pressing a lid over the opening of the cup, have been produced in order to combine the idea of a throwaway package with the demand for a package that can at the same time be used as a cup for the serving of drinks.

This invention relates to a throwaway package of the cup type made of foam plastic material, which material is suitable for being moulded into the shape of a cup and is inexpensive, but which has unsatisfactory barrier properties to prevent the passage of a gas. In order to counteract the disadvantage of the unsatisfactory barrier properties, the cup-shaped foam plastic hollow body is provided with a lining of homogeneous plastic material, the lining being somewhat shorter than the foam plastic hollow body, so that the lining part will not reach the upper edge of the foam plastic hollow body when it has been inserted into this. The foam plastic hollow body is furthermore to be covered by a lid part consisting of a disc which contains at least one layer of a material capable of being heat sealed, and the invention is characterized by the lid part, during the sealing-down process of the packaging container, being placed over the opening of the container body and being pressed against the opening of the container body by a press tool capable of being heated whereby the foam plastic material in the opening edge zone of the container body above the lining part melts and is forced outwardly and downwardly, the downward pressing of the lid part being continued until contact has been established between the upper edge of the lining part and the sealing surface of the lid part, which parts are then caused to fuse together along a continuous joint.

Figure 3:
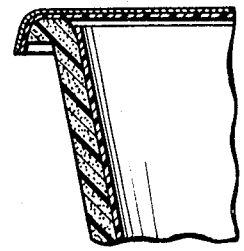
Figure 2:
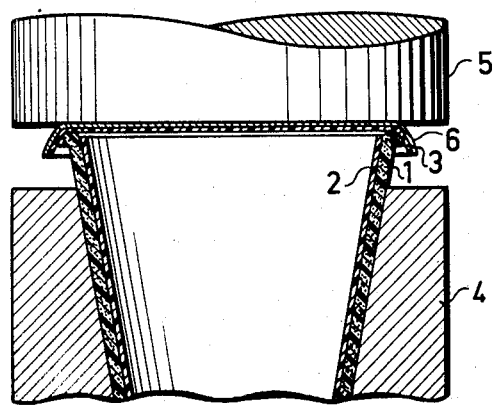
Figure 4:
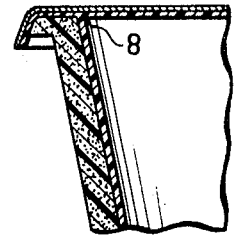

The invention will now be described by reference to the attached diagrammatic drawings, of which FIG. 1 shows a device for the placing of a lid upon a foam plastic hollow body provided with a plastic lining, FIG. 2 shows the device at the stage when the lid is being affixed to the cup-shaped hollow body, FIG. 3 shows a detail of the package where the lid has just been brought into contact with the upper edge of the foam plastic hollow body, and FIG. 4, finally, a detail of the sealed and completed package.

It is shown in FIG. 1 how a cup-shaped foam plastic hollow body 1, which is provided with an inner lining 2 of homogeneous plastic material, is placed in an outer holder 4 which has a cavity corresponding to the outside shape of the cup 1, into which cavity the cup can be admitted as shown in the Figure, and supported around its side surfaces. The inner lining 2 of the cup 1 is made in such a way that it is somewhat shorter than the cup, which is why the edge zone 3 of the cup will project in front of the upper edge of the lining 2. The lining 2 consists of a homogeneous plastic material that is capable of being heat sealed, the properties of which as regards gastightness, resistance to grease etc., are adapted to the liquid to be contained in the package. That is to say, if the liquid is e.g., an aerated drink, then the lining should consist of polyvinylchloride or some other plastic material which has satisfactory impermeability to carbon dioxide. The plastic material may even be tinted so as to provide protection from light for the packaged product. The lid part 6 consists in essence of a roundel, the shape of which corresponds to that of the opening of the cup 1, and the size of which is somewhat larger than the opening. One side of the lid must contain a layer 7 of material that is capable of being heat sealed, preferably a plastic material of the same kind as the lining 2 of the cup 1. It is best if the lid part is made up of a mechanically stiffer layer 6 and of a plastic layer 7 laid onto the under site thereof.

In the manner shown in FIG. 1, a die 5 which is capable of being heated is driven towards the cup 1 located in the holder 4, after the lid part has been placed over the opening of the cup. In the way shown in FIG. 2, the lid part is pressed against the top of the cup by the die, which is capable of being heated up, at the same time as heat which from the die 5 is conducted to the thermoplastic layer 7 by way of the lid part, the layer being heated to such a high temperature that it becomes plastic. As a result of the heat and pressure which are applied to the edge zone 3 of the foam plastic cup 1, the foam plastic will usually shrink away, and most of the cellular structure of the foam plastic material will be lost. The foam plastic material in the region 3 will shrink away until the thermoplastic layer 7 of the lid part comes into contact with the homogeneous plastic lining 2 of the cup 1. Since this plastic lining is homogenous and thus has no cellular structure, the pressing of the lid part into the upper part of the cup 1 will stop when contact between the lining 2 and the thermoplastic layer 7 has been established. As can be seen from FIG. 4, there will at the contact surface between the upper edge of the lining 2 and the thermoplastic coating 7 of the lid part, be formed a continuous joint 8 in which the plastic material of the lining 2 and the coating layer 7 are fused together.

Since the joint 8 will be very narrow, it will also be comparatively easy to tear open, which means that the lid can be torn off comparatively easily without the lining part 2 being drawn out of the cup 1 or parts of the lining part 2 being torn apart during the opening process.

If the lid is affixed in some other way, e.g., if the lining 2 is allowed to project outside the upper edge of the cup 1, the sealing zone between the lid part and the lining 2 as a result of an unavoidable folding-down of the edge of the lining, will be considerably wider and thereby stronger, which means that there will be difficulties when the lid is to be torn off so that the liquid inside the beaker should become available for consumption.

In the method in accordance with the invention, the ability of the cup material i.e., foam plastic, to be compressed by means of heat, and for the material subjected to heat and pressure to undergo a simultaneous reduction in volume, is also made use of. The pressing down of the hot lid part over the opening zone 3 of the foam plastic body 1 thus does not mean that a bead of material that has been forced away will be formed around the opening, since the volume of the material forced away is reduced considerably due to the cellular structure being destroyed.

Since it is stipulated that the thickness of the plastic lining 2 should be comparatively small, it is usually very difficult to achieve a narrow sealing zone between the plastic lining and the coating layer 7 of the lid part, where the plastic layers meet at an angle of about 90°, unless the plastic lining is mechanically supported by the foam plastic during the sealing process. The invention however gives a specification for a method of achieving the narrow sealing zone aimed at in the type of container in question, and the method in accordance with the invention has been found very advantageous.

It is clear that modifications of the constructional version shown here can be thought of within the framework of the idea underlying the invention. Plastic material types other than polyvinylchloride can e.g., be used, and also cup and lid shapes other than those shown in the drawing. It is further to be remembered that the lining is to be affixed to the outer container in such a way that the lining and the outer container form one unit. For this reason, it may be found convenient to glue the lining into the outer container or e.g., utilize the thermoplastic properties of the plastic material and heat seal the lining to the inside wall of the outer container.

I claim:

1. A method for providing a gastight closure for a packaging container comprising placing a lid member having a layer of gas impermeable, thermoplastic material on the underside thereof onto an open upper edge portion of a foam plastic hollow body having an inner liner of a homogeneous, gas impermeable, thermoplastic material extending below the open upper edge portion of the hollow body, heating the lid member to a temperature at which the foam plastic material of the hollow body becomes plastic, pressing the heated lid member against the upper edge of the hollow body, destroying the foam characteristics of the open upper edge portion of the hollow body by heating and compressing the foam plastic and fusing the lid member to the thermoplastic liner.

* * * * *